United States Patent Office 3,168,354
Patented Feb. 2, 1965

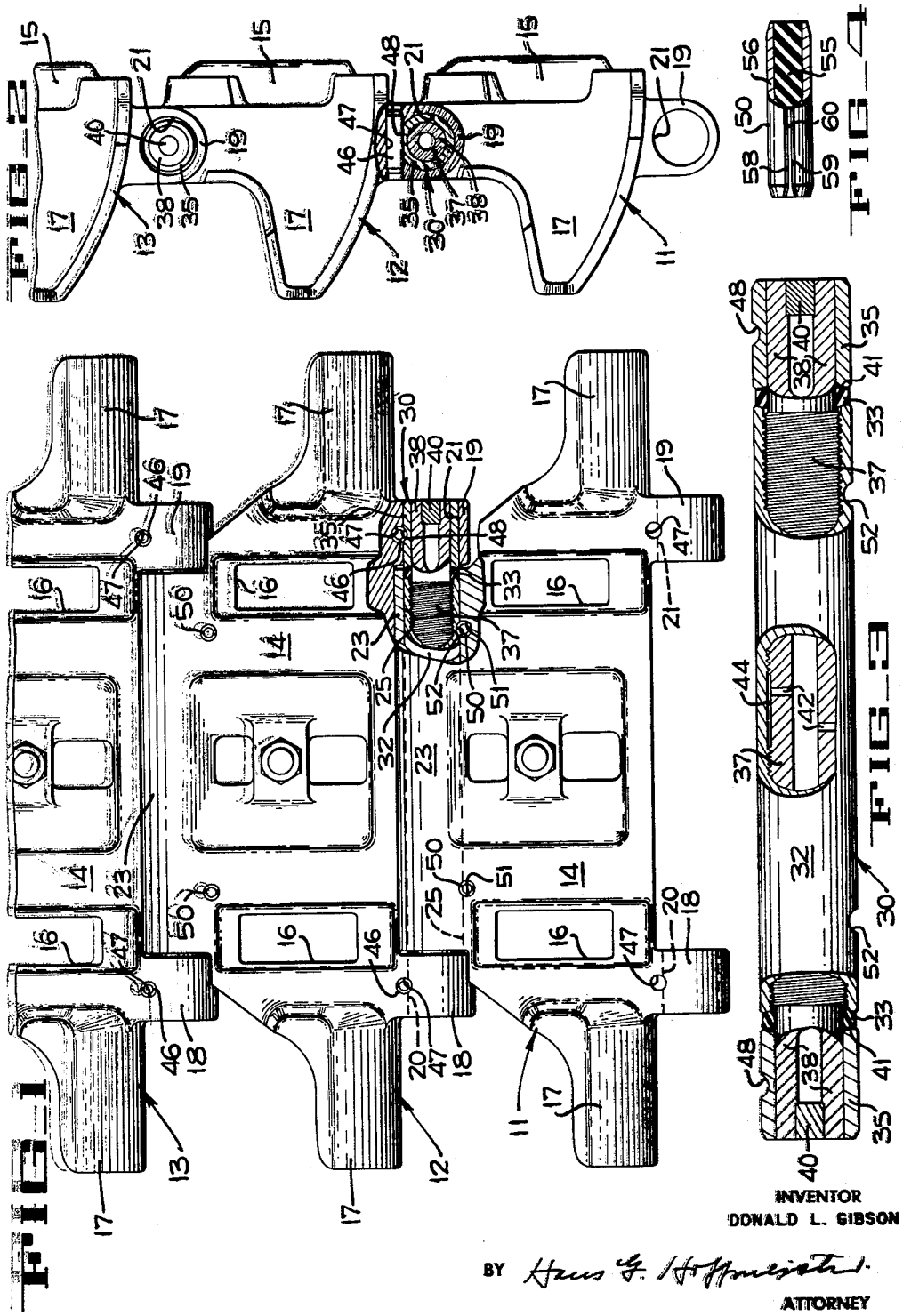

3,168,354
PIN JOINT FOR LINKS OF ENDLESS TRACKS
Donald L. Gibson, Los Gatos, Calif., assignor to FMC Corporation, San Jose, Calif., a corporation of Delaware
Filed May 17, 1963, Ser. No. 281,108
11 Claims. (Cl. 305—14)

This invention pertains to an endless track for a tracklaying vehicle such as a military landing craft and more particularly, to a pin joint for connecting adjacent track links of an endless track.

Numerous attempts heretofore have been made to provide a pin joint for the interconnection of track links that is of long life and can be easily serviced. In providing a pin joint of long life, relatively movable threaded bearing surfaces are sometimes provided since these surfaces function to reduce the possibility of entry of dirt, debris, and other foreign matter as well as to provide a compact bearing design for increasing the bearing area. However, none of the threaded pin joints heretofore available have provided a pin member which is easily insertable and removable and can effectively retain lubricant between its bearing surfaces.

An object of this invention is to provide an easily insertable and removable pin joint for interconnecting track links of an endless track.

Another object of the present invention is to provide an insertable and removable bearing pin assembly for interconnection of track links for an endless track in which said bearing pin assembly is of compact and simple construction.

A further object of the present invention is to provide a bearing pin assembly for interconnection of track links for an endless track in which the bearing surfaces are enclosed and sealed to thereby reduce the possibility of entrance of dirt, debris, contaminants and other foreign matter which tend to shorten the life of the bearing surfaces.

Still another object of the present invention is to provide a bearing pin assembly for interconnection of track links for an endless track in which the bearing pin assembly provides a lubrication reservoir to effectively lubricate the bearing surfaces of the pin assembly.

Other objects and advantages of the invention will be apparent from the following detailed description, reference being made to the annexed drawing, in which:

FIGURE 1 is a top plan view of a plurality of interconnected track links constructed according to the teachings of the present invention.

FIGURE 2 is a side elevation of FIGURE 1, portions being broken away and shown in section.

FIGURE 3 is an enlarged elevation, partly broken away and partly in cross-section, of the insertable and removable bearing pin assembly of the present invention.

FIGURE 4 is an enlarged elevation, partly broken away and partly in cross-section, of a dowel pin for locating and locking the bearing pin member of FIG. 3 in the joint of FIG. 1.

In the embodiment of the invention chosen for illustration in FIGURES 1 and 2, three interconnected links 11, 12 and 13 of an endless track are shown. Referring to link 11, it will be noted that each link includes a central relatively flat body portion 14 to which is bolted a ground-engaging rubber shoe 15 (FIG. 2). An aperture 16 is formed adjacent each side edge of the central portion 14 to receive the teeth of conventional sprockets (not shown) which drive the endless track. Adjacent each aperture 16 and disposed outwardly thereof is an upstanding member 17 that is adapted to act as a water paddle during the operation of the vehicle as an amphibian.

Along one edge, each link is provided with a pair of laterally spaced bosses 18 and 19 that have aligned bores 20 and 21. At its opposite edge, the link has a tubular member 23 formed thereon, the bore 25 of said tubular member being parallel to the axis of said aligned bores 20 and 21.

Adjacent links are interconnected by placing the tubular member 23 of one link between the bosses 18 and 19 of the adjacent link to align the three bores 20, 21 and 25. A bearing pin unit 30 is then inserted into the aligned bores. As seen in FIG. 3, the unit 30 comprises an internally threaded outer bushing 32, an annular seal ring 33 adjacent each end of the bushing 32, and a short sleeve 35 adjacent each seal 33. An externally threaded hollow pin 37, which is threaded into the bushing 32, has unthreaded end portions 38, each of which receives one of the short sleeves 35 in pressed engagement. After a supply of lubricant is forced into the interior of the hollow tubular pin 37, the ends of the pin are closed by plugs 40 that are pressed therein. Intermediate its length, the pin 37 is provided with a plurality of generally radially-extending passages 42 which direct lubricant to an annular chamber 44 that is formed near the longitudinal center of the unit by adjacent unthreaded portions of the outer bushing 32 and the inner pin 37. The lubricant will, of course, work its way between the relatively movable surfaces of the interengaging threads of the members and will be prevented from moving out of the joint by the seal rings 33. As seen in FIG. 3 each seal 33 may be made of rubber with an annular bearing member 41 bonded on one end face.

Referring in FIG. 1 to the joint between links 11 and 12, it will be appreciated that, during operation, the inner pin 37 swings with link 12 while the outer bushing 32 swings with link 11. Two spring dowels 46 connects the inner pin 37 to the link 12, each dowel being disposed in a hole 47 in the link 12 and in a tangential peripheral slot 48 provided in the adjacent short sleeve 35 that is, as previously mentioned, pressed on the end of inner pin 37. As seen in FIG. 2, when the link 12 pivots, each dowel 46 will move with it, and cause the sleeve 35 and the inner pin 37 to move with the link 12.

The outer bushing 32 is keyed to the link 11 in an identical manner by two spring dowels 50 which are disposed in holes 51 in the tubular member 23 of link 11 and pass through slots 52 (FIG. 3) in the outer bushing 32.

Each spring dowel includes a central cylindrical core 55 (FIG. 4) of synthetic rubber and a cadmium plated spring steel housing 56 which has spaced longitudinal edges 58 and 59 that define a gap 60.

The four dowels 46 and 50 also retain the pin unit 30 again axial movement in the bores of the associated links.

When it becomes desirable to replace a pin unit 30, the associated dowels 46 and 50 are quickly driven out of their holes and the unit 30 is then slid axially out the bores in the links. A new, pre-lubricated unit may then be slid into the bores and secured therein by suitable dowels. It should be particularly noted that, due to the fact that the bearing assemblies are pre-lubricated, sealed units, they can be replaced in the field, using only the simplest of tools.

Having thus described my invention, what I claim as new and desire to protect by Letters Patent is:

1. In combination, a first and a second link having juxtaposed edge portions, means defining aligned bores in said edge portions, a bearing unit disposed in said bores and including an outer member releasably secured to one of said links for rotation therewith and an inner member releasably secured to the other of said links, said inner and outer members having threads providing interengaging bearing surfaces, said bearing unit being freely insertable and removable as a unit into and out of said bores.

2. In combination, a first and a second link having juxtaposed edge portions, means defining aligned bores in said edge portions, a generally cylindrical bearing unit disposed in said bores and including an outer member and an inner member having interengaging threaded surfaces, said bearing unit being freely slidably insertable axially in said bores, and dowel pins connecting said outer member to one of said links and connecting said inner member to the other link for pivoting with said links about the axis of the cylindrical bearing unit.

3. In combination, a first and a second link having juxtaposed edge portions, means defining aligned bores in said edge portions, a generally cylindrical bearing unit disposed in said bores and including an outer member axially slidable in said bores and an inner member having interengaging threaded surfaces, and dowel pins connecting said outer member to one of said links and connecting said inner member to the other link for pivoting with said links about the axis of the cylindrical bearing unit, each of said dowel pins including a cylindrically walled metal housing having a longitudinal gap therein and a generally cylindrical resilient filler member disposed in said housing whereby said pins are resiliently radially compressible to facilitate insertion and removable from operative association with said links.

4. In combination, a first and a second link having juxtaposed edge portions, means defining aligned bores in said edge portions, a bearing unit disposed in said aligned bores and including an internally threaded bushing slidable axially in said bores and an externally threaded tubular pin threaded into said bushing, the interior of said tubular pin providing a reservoir for lubricant, means providing communication between said reservoir and the space between the interengaging threaded surfaces of said bushing and said pin, means removably connected between said bushing and said first link for causing pivoting of said bushing with said first link, and means removably connected between said tubular pin and said second link for pivoting said pin with said second link.

5. In combination, interconnecting links having their opposite edge portions in juxtaposed relation, means defining aligned bores through said edge portions, a bearing unit inserted axially through said aligned bores and including an internally threaded sleeve freely axially slidable in said bores and an externally threaded tubular pin member, a reservoir for lubricant within said tubular member and means communicating the lubricant to the space between the interengaging threaded surfaces of the sleeve and pin member, means defining openings in said opposite edge portions to extend tangentially through the bores, removable dowels inserted in the openings to secure the sleeve to one link and to secure the pin member to the other link for pivoting about the longitudinal axis of said bearing unit.

6. In combination, interconnecting links having their opposite edge portions in juxtaposed relation, means defining aligned bores through said edge portions, a bearing unit inserted axially into the aligned bores and including an internally threaded sleeve and an externally threaded pin member, said sleeve and said member being freely slidable in said bores, said sleeve being in threaded engagement with said pin member intermediate the ends thereof, means defining openings through said opposite edge portions to extend tangentially through the bores therein, and removable dowels inserted into the openings to secure the ends of said pin member to one link and to secure said sleeve to the other link for pivoting about the axis of said bearing unit.

7. In combination, interconnecting links having their opposite edge portions in juxtaposed relation, means defining aligned bores through said edge portions, a bearing unit inserted axially into the aligned bores and including a sleeve and a tubular pin member, said sleeve and said pin being freely slidable in said bores, the interior of the sleeve being in interengagement with the exterior of the tubular pin member intermediate the ends thereof, a reservoir within the tubular pin member for lubricant and means within the tubular pin member communicating the lubricant between the space of the interengaged surfaces of the sleeve and the pin member, means defining openings in said edge portions to intersect and extend through the bores therein, removable dowels inserted through the openings to secure one link to the sleeve and to secure the other link to the ends of the pin member for pivoting about the axis of said bearing unit.

8. In combination, a first and a second link having juxtaposed edge portions, means defining aligned bores in said edge portions, a bearing unit freely axially slidably disposed in said aligned bores and including an internally threaded bushing and an externally threaded tubular pin threaded into said bushing and having a hollow center defining a reservoir for lubricant, means providing communication between said reservoir and the space between the interengaging threaded surfaces of said bushing and said pin including an annular recess defined by confronting unthreaded portions of said bushing and said pin and radial passages in said pin opening into said recess, and removable connectors securing said bushing to one link and said pin to the other link.

9. In combination, a first and a second link having juxtaposed edge portions; means defining aligned bores in said edge portions; and a generally cylindrical bearing unit disposed in said bores and including a central cylindrical pin, a bushing of less length than said pin pivotally disposed on said pin intermediate its length, a short sleeve keyed to each end of said pin adjacent one end of said bushing, and removable connectors securing said two short sleeves to one of said links and said bushing to the other of said links, said bearing unit being axially insertable into and removable from said bores when said connectors are removed.

10. In combination, a first and a second link having juxtaposed edge portions, means defining aligned bores in said edge portions, a bearing unit axially slidably disposed in said bores, said unit including an outer member and an inner member having interengaging threaded surfaces, first pin means releasably disposed between said first link and said inenr member for precluding movement between said first link and said inner member, and second pin means releasably disposed between said second link and said outer member for precluding movement between said second link and said outer member.

11. In combination, a first link and a second link having juxtaposed edge portions, said edge portions being provided with axially aligned bores of substantially equal diameter; a generally cylindrical bearing unit disposed in said bores, said bearing unit including a bushing having an outside diameter substantially equal to the diameter of said bores, a cylindrical pin disposed within said bushing, and extending axially outward of said bushing, cylindrical sleeves secured on the ends of said pin and having a diameter substantially equal to the diameter of said bores, each of said sleeves being provided with a groove extending across its outside surface in a generally transverse direction to the axis of the sleeve, said bushing being provided with a groove extending across its outside surface in a generally transverse direction to the axis of the bushing; said links being provided with openings extending therethrough and opening into said bores, said openings and said grooves being arranged to provide dowel receiving apertures; radially resilient removable dowels disposed and resiliently maintained in said apertures for precluding movement between one of said links and the associated sleeves, and between the other sleeve and the associated bushing; said bearing unit being freely slidable axially into and out of said bores when said dowels are removed.

References Cited in the file of this patent

UNITED STATES PATENTS

| | | |
|---|---|---|
| 1,289,408 | Davis | Dec. 31, 1918 |
| 2,342,675 | Knox | Feb. 29, 1944 |
| 2,716,822 | Launders et al. | Sept. 6, 1955 |
| 2,970,866 | Horste | Feb. 7, 1961 |

FOREIGN PATENTS

| | | |
|---|---|---|
| 29,939 | Australia | July 9, 1931 |